United States Patent [19]

Kellogg

[11] 4,047,441
[45] Sept. 13, 1977

[54] MECHANICAL COUNTERBALANCE ASSEMBLY

[75] Inventor: Richard Webster Kellogg, Seattle, Wash.

[73] Assignee: The Boeing Company, Seattle, Wash.

[21] Appl. No.: 654,381

[22] Filed: Feb. 2, 1976

[51] Int. Cl.² ............................................. F16H 37/12
[52] U.S. Cl. ....................................... 74/52; 160/189; 185/9
[58] Field of Search .......................... 49/215, 360, 363; 185/9, 11; 160/189

[56] References Cited

U.S. PATENT DOCUMENTS

| 3,160,200 | 12/1964 | McKee et al. | 160/189 |
| 3,585,757 | 6/1971 | Ritchie | 49/215 |
| 3,637,004 | 1/1972 | Wardlaw | 160/189 |
| 3,802,125 | 4/1974 | Baker | 49/360 |

Primary Examiner—Samuel Scott
Assistant Examiner—Wesley S. Ratliff, Jr.
Attorney, Agent, or Firm—Christensen, O'Connor, Garrison & Havelka

[57] ABSTRACT

A mechanical counterbalance assembly for an overhead, track mounted, aircraft door includes a frame, a shaft mounted for rotation in the frame, and a torsion spring interconnected between the shaft and the frame. As the shaft is turned in a first direction, the spring is wound so that a torque is applied to the shaft in the direction opposite to rotation. The spring rate of the torsional spring is selected so the spring torsional force slightly exceeds the component of the door weight acting along the path of motion of the door throughout the door travel. A cable drum is mounted for rotation on the shaft and is releasably affixed thereto. A cable is wrapped about the drum and has its free end connected to the overhead sliding door. A planetary gear train has its low speed input shaft coupled to the shaft and its high speed output shaft operatively coupled to a centrifugal brake and to a manually rotatable drive wheel. When the door is lowered from its open position to its closed position, cable is unwound from the drum, rotating the shaft to store energy in the spring. When the door is opened, a torque is imparted to the shaft by the spring to counterbalance the door and assist in raising it to an open position. Should the cable break or the door be lightened for any reason, the rotational speed of the shaft as urged by the spring is limited by a centrifugal brake coupled to the high speed output of the planetary gear train. Similarly, should the torsional spring break, the lowering rate of the door is limited by the action of the centrifugal brake.

10 Claims, 8 Drawing Figures

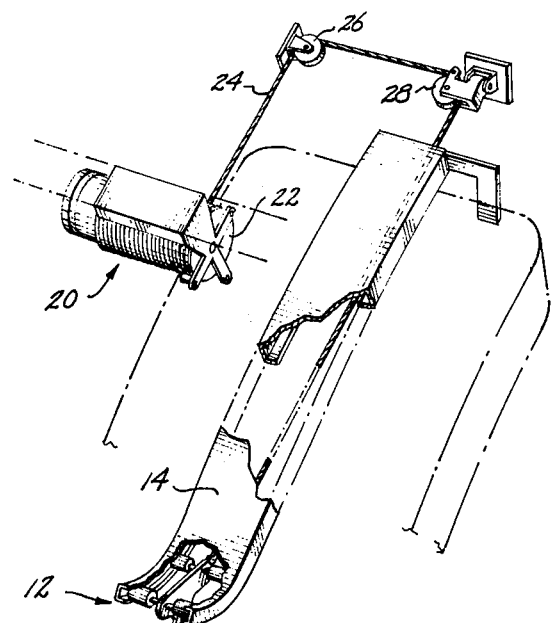
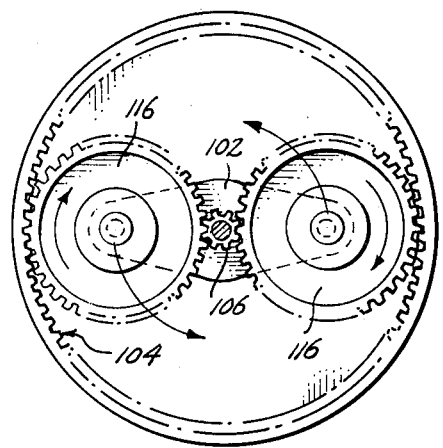
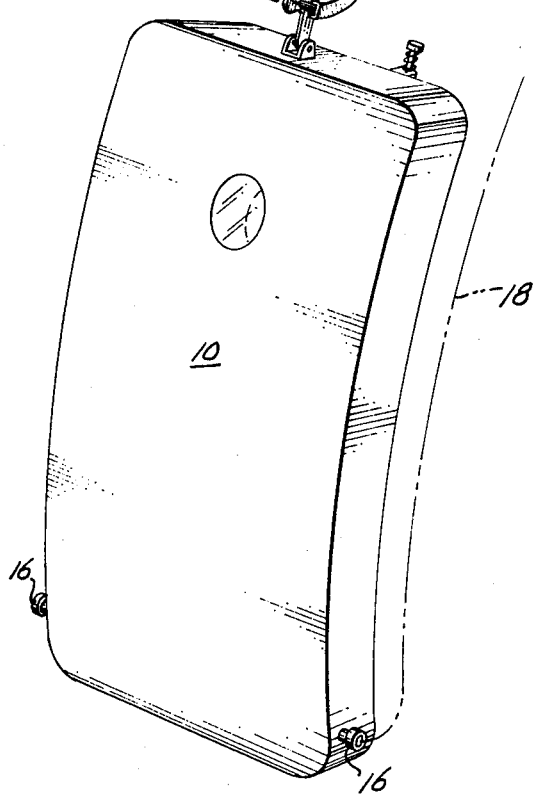
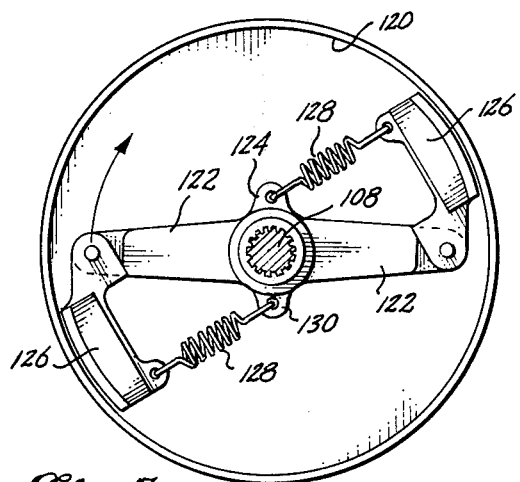
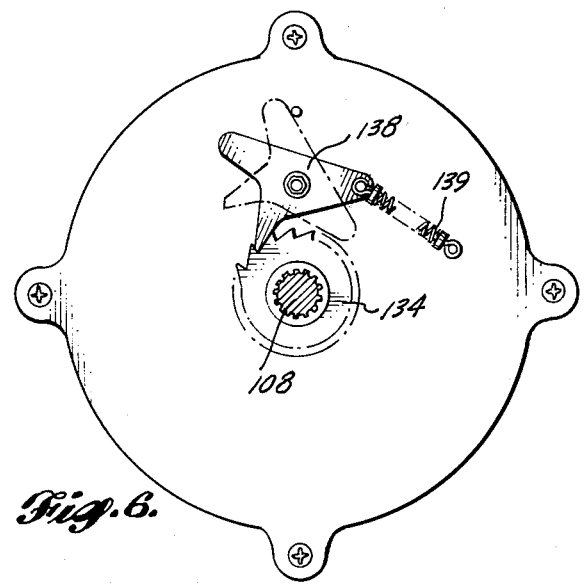
Fig. 1.
Fig. 6.
Fig. 7.
Fig. 8.

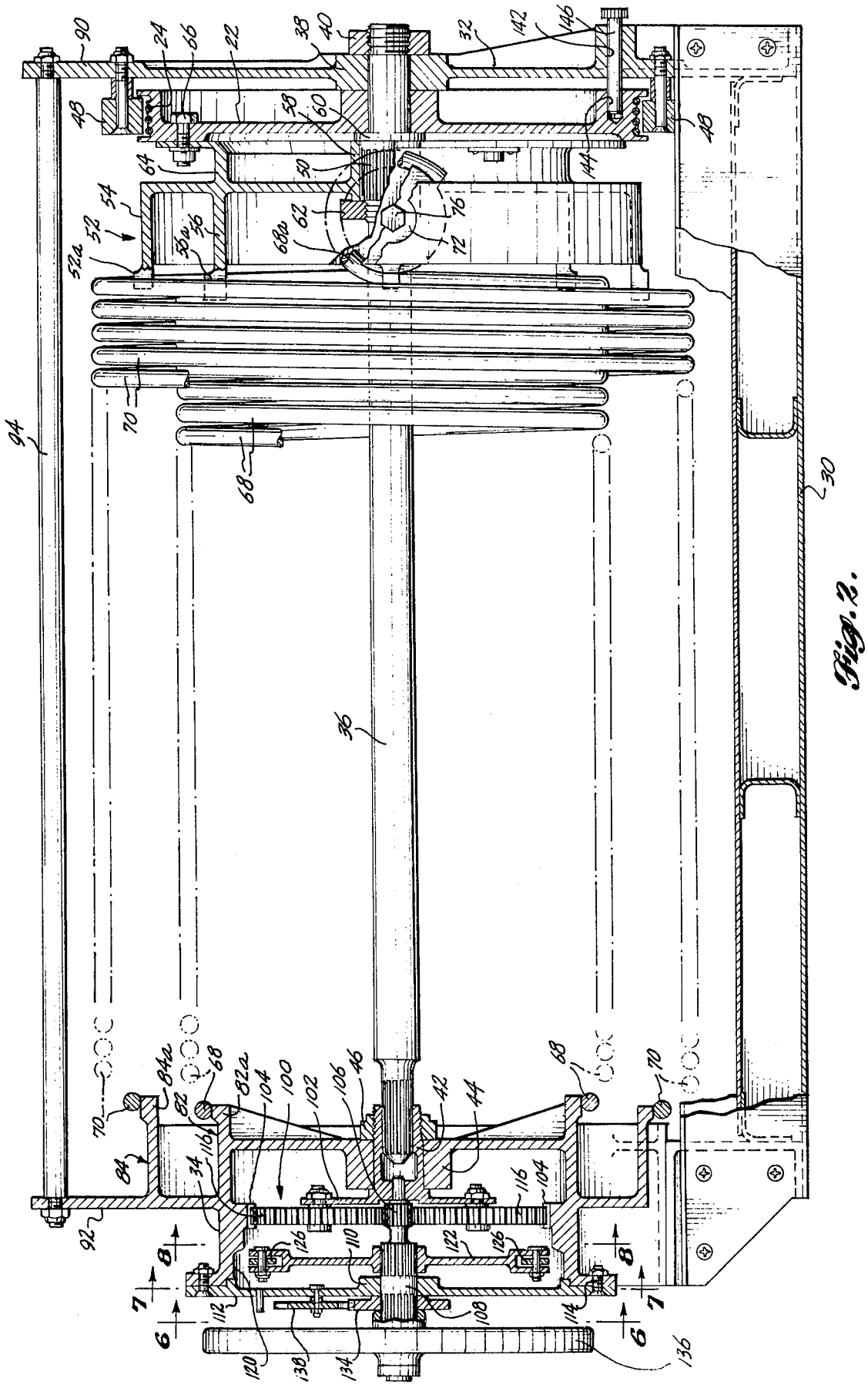

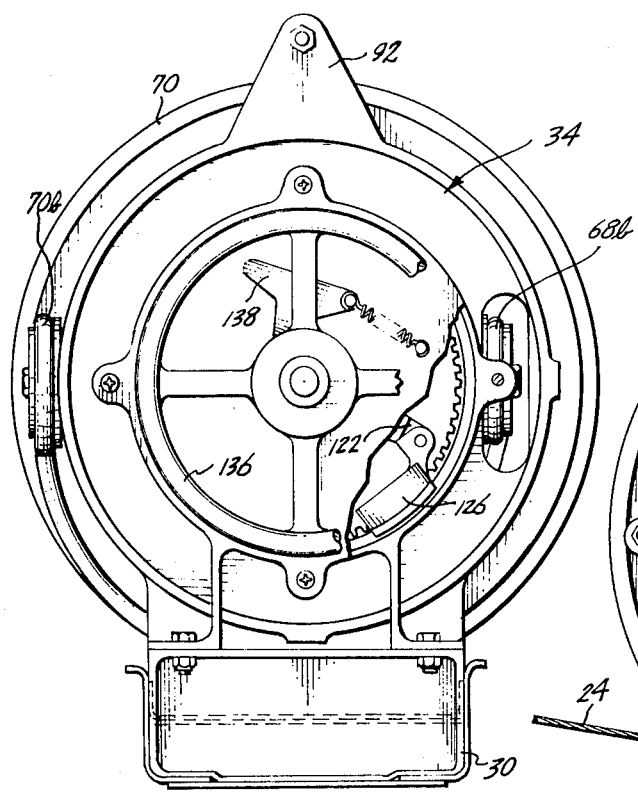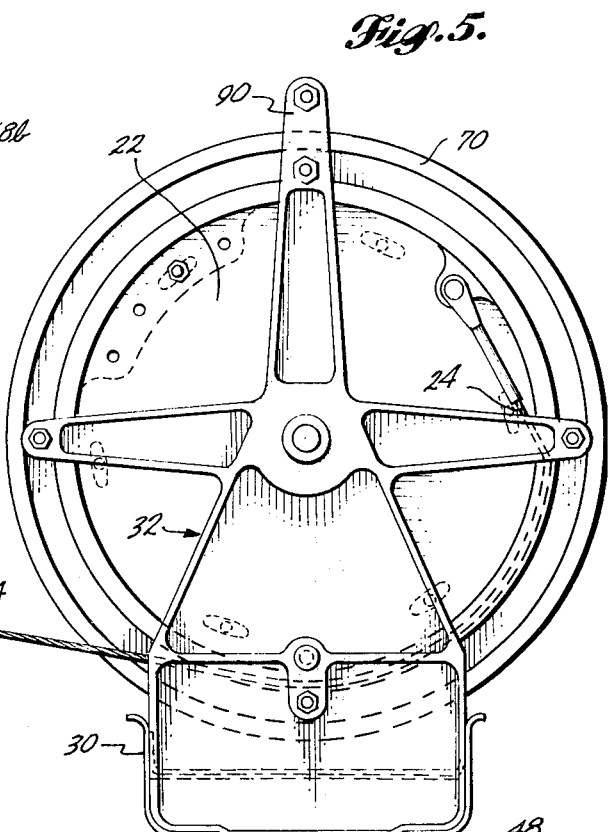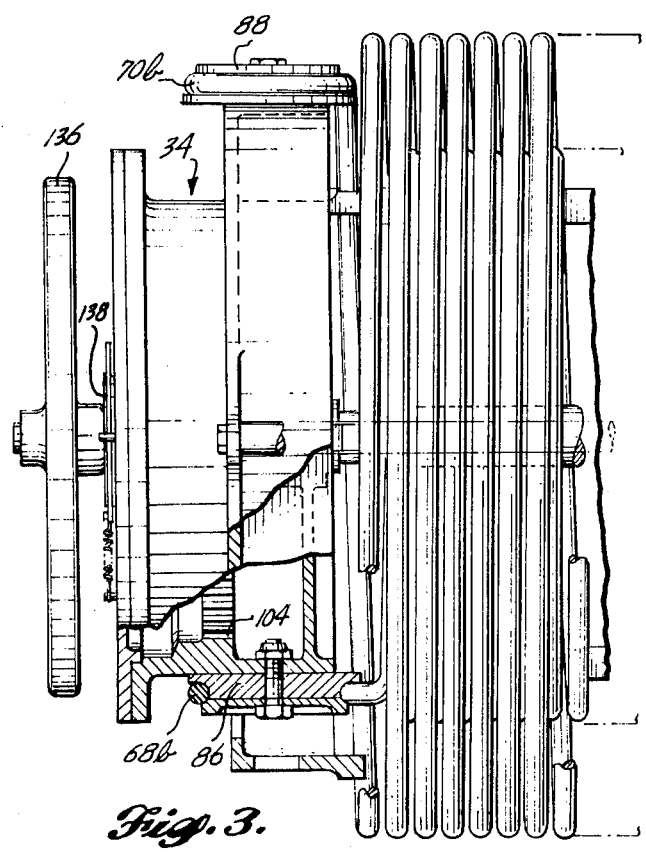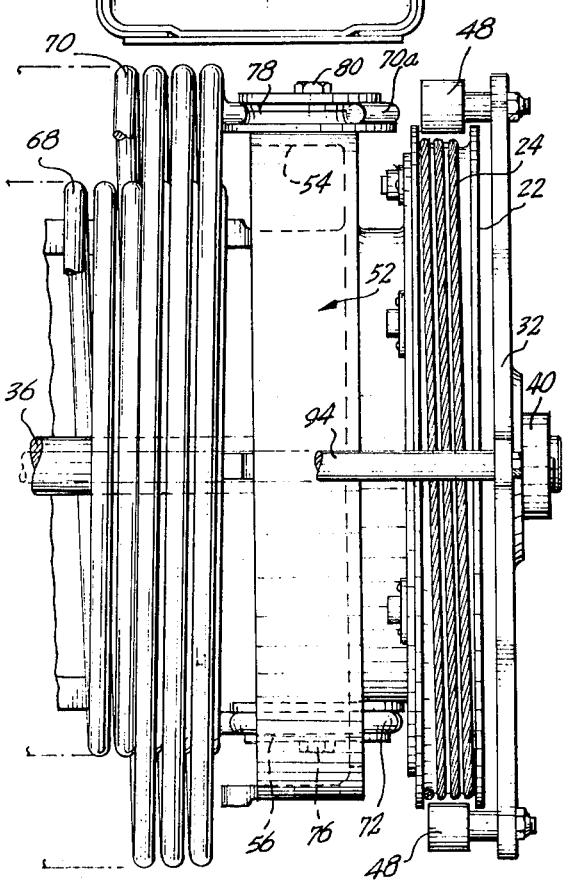

MECHANICAL COUNTERBALANCE ASSEMBLY

BACKGROUND OF THE INVENTION

The present invention relates to counterbalance assemblies, and more particularly to a mechanical counterbalancing assembly for closure devices such as overhead sliding doors.

Overhead sliding doors are desirable for use in passenger aircraft for a variety of reasons, including ease of manufacture, ease of assembly, a minimum number of uncomplicated operating parts, and stowage in a remote location over the door opening when in use. Doors of this type are conventionally power driven. However, to reduce cost, weight, and complication of the door operating mechanism, it is desirable to eliminate the necessity for the power drive feature and to provide an improved counterbalancing mechanism that will provide the capability of readily opening and closing the door manually.

The weight of the door to be counterbalanced will vary, based on customer preferences in door design and because emergency escape equipment, normally attached to the door, may be unattached when the door must be closed or opened. Therefore, another object of the present invention is to provide a counterbalance assembly that can easily and economically accommodate a range of door weights. A further object of the present invention is to provide mechanism that will prevent the door from opening too fast if the counterbalance assembly is assisted in its function or when the door is opened in a emergency free of the weight of the escape equipment.

Further objects of the present invention are to provide a counterbalance assembly that will generate little internal friction, that will be light, that will be relatively simple and inexpensive to manufacture, and that will be compact as practicable.

SUMMARY OF THE INVENTION

In accordance with the foregoing objects, and other objects that will become apparent to those of ordinary skill in the art after reading the following specification, the present invention in its broadest sense provides a torsional counterbalance assembly including a rotatable member having a rotational axis and frame means for mounting the rotatable member for rotation about its axis. A torsional spring means is associated with the rotatable member and the frame to impart torque to the shaft, i.e., to rotatably drive the shaft in a first direction and to resist its rotation in the opposite direction. A second rotatable member is associated with the first rotatable member and is mounted for rotation relative thereto. A means is associated with the second rotatable member for translating the rotational motion of the second rotatable member into linear motion. For example, the second rotatable member can comprise a cable drum with a cable wrapped thereabout to translate the rotational motion of the drum into linear motion for application to an overhead sliding aircraft door. A connection means is associated with the first and second rotatable members for releasably interconnecting the two so that the spring means can be pre-tensioned without moving the door. In a preferred embodiment, a locking means is associated with the second rotatable member for preventing rotational movement of the latter while the spring means is being pre-tensioned. A drive means is also associated with the first rotatable member for manually rotating the first rotatable member to pre-tension the spring as necessary. In a preferred embodiment, a governing means, such as a centrifugal brake is associated with the first rotatable member to limit its rotational speed in either direction. In a preferred embodiment, a speed increasing gear train is coupled between the first rotatable member and the speed governing centrifugal brake and the drive means to provide a mechanical advantage to the brake action and to the manually operated drive means.

BRIEF DESCRIPTION OF THE DRAWINGS

A better understanding of the present invention can be derived by reading the ensuing specification in conjunction with the accompanying drawings wherein:

FIG. 1 is a simplified isometric view of an overhead, track-mounted, aircraft door counterbalanced by the counterbalance assembly of the present invention;

FIG. 2 is a greatly enlarged side elevation view of the counterbalance assembly of the present invention in partial longitudinal section and partially broken away;

FIG. 3 is a plan view in partial cross section with the central portion of the assembly broken away to reduce the size of the view;

FIG. 4 is an end elevation view of the counterbalance assembly shown in FIGS. 2 and 3 from the end on which the gear train and brake housing are located;

FIG. 5 is an end elevation view of the counterbalance assembly from the opposite end to that shown in FIG. 4;

FIG. 6 is a cross sectional view taken along section line 6—6 of FIG. 2;

FIG. 7 is a cross sectional view taken along section line 7—7 of FIG. 2; and

FIG. 8 is a cross sectional view taken along section line 8—8 of FIG. 2.

DETAILED DESCRIPTION

The counterbalance assembly of the present invention can be employed with a plug-type overhead aircraft door similar to that shown in FIG. 1. It can also be employed to offset the weight of other vertically movable devices to permit simple manual raising and lowering of the devices without the necessity of bulky, complicated, energy consuming prime movers. The plug-type aircraft door 10 illustrated in FIG. 1 is mounted on three sets of tracks, including an overhead central track 14 and two side tracks (not shown) located adjacent the sides of the door opening in an aircraft fuselage. The overhead and side tracks are all securely attached by conventional means adjacent the door opening in the aircraft fuselage. The door is supported in the overhead track 14 by a roller carriage 12 pivotally attached to the central, upper portion of the door. Rollers 16, mounted on the sides of the door adjacent its bottom end, ride in the side tracks. The tracks are shaped so that the door 10, when opened, first moves inwardly to de-register the door from the opening in an inward direction and thereafter moves upwardly along the track to an elevated position wherein the door is located above the door opening inside the aircraft fuselage. The path of the roller carriage 12 can be observed in the drawings as being first inward and then upward. The dot-dash lines 18 indicate the inward and upward path of the rollers 16 following the side tracks.

The counterbalance assembly 20 of the present invention can be affixed to the fuselage, preferably at a location above and to one side of the travel path of the door. The counterbalance assembly 20 includes a torsion spring to be described in greater detail below coupled to a cable drum 22. A cable 24 is wrapped about the drum and extends from the drum through a set of suitable sheaves 26 and 28 and thereafter is fastened to the roller carriage 12. It will be noted that the path of the cable follows generally the path of the overhead track 14 between the carriage and the sheave 28 located above the upper end of the overhead track 14. The cable 24 is then routed at a right angle through the other sheave 26 where it doubles back toward the counterbalance assembly 20 along a path generally parallel to its original direction from the roller carriage to the first sheave 28. The cable 24 is thereafter wrapped around the cable drum 22.

In operation, the torsion spring forming part of the counterbalane assembly 20 is pre-tensioned when the door is in its closed position. When the door is unlatched by conventional means, the force of the torsion spring imparted to the cable drum 22 will be sufficient to wrap the cable 24 onto the drum 22, thus moving the door from its closed position to its elevated, open position. In reverse operation, the door is manually pulled downwardly, unwrapping cable from the drum 24 and winding the torsion spring forming part of the counterbalance assembly. In this manner, energy is stored in the torsion spring for use when it is desired to again open the door 10.

Referring to FIGS. 2, 3 4 and 5, the counterbalance assembly of the present invention is mounted on a frame including a torque box 30 comprising upper and lower skins interconnected by transverse stiffening members. A stanchion 32 extends upwardly from one end of the torque box and is rigidly fastened by conventional means to that end of the box. A gear and brake housing 34 is affixed to and extends upwardly from the opposite end of the torque box 30 in opposing relationship to the stanchion 32. A shaft 36 is oriented parallel to the torque box 30 and spaced upwardly therefrom. One end of the shaft 36 is journaled in a suitable bushing 38 forming part of the central portion of the stanchion 32 and is retained in the bushing 38 by a suitable retaining nut 40 threaded onto the end of the shaft 36. The other end of the shaft 36 is splined and inserted into an internally splined bore in a hub 42 forming part of a planetary gear carrier, which is in turn journalled in a bushing 44 integral with the side of the gear housing 34 opposing the stanchion 32. The gear-carrying hub 42 has an externally threaded inner end which is retained in axial position relative to the bushing 44 by an internally threaded retaining nut 46.

The cable drum 22 is rotatably mounted on the shaft 36 adjacent the stanchion 32. The cable 24 is wrapped about the drum and extends outwardly to the sheaves and the door (FIG. 1). Cable retention guards 48 are mounted on the uppr and lower portions of the stanchion 32 on shafts oriented parallel to the axis of the drum 22, as well as on arms extending transversely from the central portion of the stanchion 32. The guards are positioned adjacent the drum to prevent the cable from flying off the drum should it become slack for any reason. The portion of the shaft 36 immediately adjacent the location of the cable drum 22 is enlarged and carries splines 50. A torsion spring carrier 52, has a generally circular backplate oriented concentrically with the shaft 36 with a pair of concentrically located, inwardly extending annular flanges 54 and 56 integral with the inner face of the plate. Annular flanges 54 and 56 each have three tangs 54a and 56a extending inwardly and so spaced as the contact to end coil of the torsion springs 68 and 70 respectively when pretensioned to the door open position so that the springs are supported and restrained to rotate concentrically relative to the shaft 36. A central hub 58 on the circular plate carries internal splines that mate with the splines 50 on the enlarged portion of the shaft 36. The outer end of the hub 58 abuts flange 60 on shaft 36, which in turn abuts the inner face of the cable drum 22. A suitable retaining nut 62 is threaded onto the shaft adjacent the splines 50 to secure the spring carrier 52 in position on the shaft. Thus the cable drum 22 is mounted for rotation on the shaft 36 while the spring carrier 52 is fixed to rotate with the shaft. The spring carrier 52 carries an outwardly protruding flange 64 on its outer face that extends perpendicularly outwardly relative to the circular plate forming part of the carrier 52 and then extends radially outwardly contiguous with the inner face of the cable drum 22 and adjacent the periphery of the drum. A plurality of bores oriented parallel with the shaft 36 is provided in the flange 64, which bores can be aligned with a plurality of bores arranged in a circular array adjacent the periphery of the cable drum 22. A suitable fastener, such as nut and bolt 66, is inserted through one of the bores in the flange 64 and through one of the aligned bores in the cable drum 22 to releasably affix the cable drum 22 to the spring carrier.

In the preferred embodiment of the present invention, two cylindrically shaped, helically wound torsion springs 68 and 70 are employed to impart torque to the shaft 36 when under tension and to store energy for opening the door 10 (FIG. 1) when it is in a closed position. Inner spring 68 has a smaller diameter than does the outer spring 70. The springs are mounted coaxially about the shaft 36. Each end of the spring carries retaining loops 68a, 68b, 70a and 70b by which the springs are affixed respectively to the spring carrier 52 and to the gear housing 34. For example, inner spring 68 carries retaining loop 68a which is wrapped about a retainer assembly 72 and fastened by a bolt 76 to the inner annular flange 56 on the spring carrier 52. Similarly, the outer spring 70 carries a retaining loop 70a wrapped about a suitable retainer assembly 78 in turn fastened by a bolt 80 to the outer annular flange 54 on the spring carrier 52.

The inner side of the gear housing 34 carries a pair of annular flanges 82 and 84 corresponding in diameter generally to the flanges 56 and 54, respectively, on the spring carrier. These spring retention flanges 82 and 84 each have three tangs 82a and 84a similar to 54a and 56a to support and restrain the other ends of torsion springs 68 and 70 and are located coaxially about the shaft 36. The retaining loops 68b and 70b on the other ends of the springs 68 and 70 are in turn fastened respectively to the inner flange 82 and outer flange 84 by retention assemblies 86 and 88. Thus, one end of each of the torsion springs is fastened to the spring carrier 52 mounted for rotation with the shaft 36 while the other ends of the springs 68 and 70 are fixed to the gear housing 34. As the shaft 36 is rotated in a first direction, i.e., viewing the stanchion end of the assembly (FIG. 5), rotation of the shaft 36 in a clockwise direction will torque the springs so as to store energy in them. Allowing the energy stored in the spring to be imparted to the shaft will, vice versa, rotate the shaft 36 in a counterclockwise direction.

To prevent the springs from becoming entangled in each other or from distorting too far fram their coaxial orientation with the shaft 36 in the vertical direction, stanchion 32 carries a generally upright flange 90 extending radially above the normal height of the outer spring 70 while the gear housing 34 carries a similar upright flange 92 extending above the periphery of the outer spring 70. A stiffening rod 94 extending generally parallel to the shaft 36 has each of its ends fastened to the flanges 90 and 92. The stiffening rod 94 serves the dual purpose of preventing the outer spring from distorting vertically beyond the location of the shaft 94 as well as providing structural rigidity to the stanchion 32, the gear housing 34 and the torque box 30.

Referring now to FIGS. 2, 6, 7 and 8, the speed-increasing planetary gear assembly generally designated 100 includes the planetary gear carrier 102, comprising two diametrically opposed arms formed as an integral part of the hub 42 in which the main torque shaft 36 is splined, an internally toothed ring gear 104 formed concentrically about the hub 42 on the internal surface of the gear housing 34, and a sun gear 106 integral with stub shaft 108. The stub shaft 108 has a small diameter inner end which is rotably mounted in a central bore coaxial with the planetary gear carrier hub 42. The other end of the stub shaft 108 is rotatably mounted in a bushing 110 provided in the outer removable housing cover 112, which is axially spaced from the inner side of the gear housing 34 and fastened to the gear housing 34 by suitable fasteners 114. The planetary gear carrier 102 carries a pair of planetary gears 116 that are sized to mesh with the internal teeth on the ring gear 104 and the external teeth on the sun gear 106. As the main torque shaft 36 is rotated, the planetary gears 116 mesh with the teeth of the ring gear 104 in turn to drive the sun gear 106 and consequently stub shaft 108. The stub shaft 108 thus rotates at an increased speed relative to the main torque shaft 36 dependent upon the gear ratios employed in the planetary gear system.

A brake drum surface 120 is machined within the housing 34 at a location spaced longitudinally outwardly along the stub shaft 108 and outwardly from the integral ring gear 104. A pair of diametrically opposing brake shoe carriers or arms 122 joined by a central hub 124 are splined to the stub shaft 108 between the location of the sun gear 106 and the journalling location of the stub shaft 108 in the housing cover 112. Each of the arms 122 carries a pivotally mounted brake shoe 126 adjacent its outer end. The brake shoes 126 can pivot on the shoe carrier arms 122 so as to cause their outer, arcuate surfaces to come into contact with the brake drum surface 120 in the housing. The brake shoes 126 are biased to an inward position where they are not contacting the brake drum surface 120 by a pair of suitably tensioned coil springs 128 connected between the shoes 126 and flanges provided on the hub 124 of the shoe carrier. The spring force of the springs 128 is chosen so that the brake shoes 126 will be inwardly biased until the centrifugal force on the shoes created by the rotating stub shaft 108 reaches a predetermined value. When the centrifugal force reaches a predetermined value, the brake shoes will pivot outwardly and contact the brake drum surface to limit or govern the speed at which the stub shaft 108 is rotating.

The outer end of the stub shaft 108 is splined to carry a ratchet wheel 134 and a large hand rotatable wheel 136. A pawl 138 is pivotally mounted on the outer surface of the housing cover 112 and is biased by an over-center compression spring 139 to a first position in which it is in contact with the ratchet wheel 134 and a second position wherein the ratchet wheel can rotate freely without interference from the pawl 138. The pawl and ratchet are designed so as to prevent rotation of the stub shaft, and thus the main shaft 36, when torque is imparted by the springs 68 and 80.

In installation and use, the torsion springs 68 and 70 can be pretensioned in the manufacturing facility prior to installation and can be adjusted after the counterbalance assembly is installed on an aircraft in conjunction with an aircraft door or can be completely adjusted for use with any of a number of doors of varying weight after the counterbalance assembly is installed on an aircraft. When the torsion springs are pretensioned during manufacture and assembly of the counterbalance assembly, the spring carrier 52 is fastened to the cable drum 22 by the interlocking fastener 66. When energy is stored in the springs 68 and 70 prior to operation, the cable drum and thus the spring carrier 52 can be temporarily locked in position so as not to release the energy stored in the springs. A simple locking assembly is provided to perform this function. A bore 140 through the base of the stanchion 32 extends toward the cable drum 22 at a location inwardly from but adjacent to the periphery of the drum. A bore 144, is provided in the outer face of the cable drum 22 and can be mutually aligned with the bore 142 in the stanchion 32. A locking pin 146, inserted through the bore 142 and into a mutually aligned bore 144, firmly holds the cable drum 22 and prevents it from rotating relative to the stanchion 32. Thus the cable drum and the spring carrier 52 can be locked in a predetermined position so that the springs 68 and 70 can be pre-tensioned during manufacture and the energy in the springs stored until the counterbalance assembly is installed for use.

In actual use, the torsion springs 68 and 70 are pretorqued to a predetermined value somewhat near that necessary to support the weight of an average aircraft door carrying conventional accessories. Depending upon the particular door with which the counterbalance assembly is being used and the size and weight of the accessories, such as emergency equipment, normally attached to such a door, the counterbalance assembly can be further adjusted after installation. When adjusting the assembly, the aircraft door is lowered to its closed position in the door opening. During manufacture of the assembly 20, a small amount of cable 22 is wound on the drum 24. The locking pin 146 is then inserted into the bore 142 at the bottom of the stanchion 32 so as to lock the cable drum 22 in place. The cable is then affixed to the roller carriage 12 forming part of the door assembly. Thereafter, the fastener 66 interconnecting the cable drum and the spring carrier is removed while grasping the hand wheel 136 to prevent rotation of the shaft 36 under the force imparted by the springs 68 and 70. The pawl 138 and ratchet wheel 134 are oriented so that when the pawl 138 is in contact with the ratchet wheel, the torsional force on the wheel is checked, i.e., the wheel is prevented from rotating in the direction in which it is biased by the torque springs 68 and 70. Hand wheel 136 is then rotated to either relieve some of the torque stored in the springs 68 and 70 or to increase the torque that the springs 68 and 70 are capable of imparting to the shaft 36, thus either increasing or decreasing the counterbalancing force provided by the assembly to match the overall weight of the door in its normal condition. It will be noted that the speed reduction capability of the planetary gear train 100 will allow several rotations of the hand wheel for only one rotation of the shaft 36, thus making it easy for an individual to rotate the wheel 136 manually, although the shaft 36 is being subjected to a significant torque by the springs 68 and 70. Once the correct amount of torque has been stored in the springs 68 and 70, the spring carrier 52 is aligned relative to the cable drum 22 so that the fastener 66 can again be inserted to interlock the drum with the spring carrier. The locking pin 146 is then removed so as to allow the full weight of the door to be transmitted via the cable to the cable drum. Thereafter, the hand wheel 136 is rotated so that the pawl 138 can be disengaged from the ratchet wheel 134 and moved to its non-interfering position.

The centrifugal brake is employed to prevent the shaft 36 from rotating at a high speed under emergency conditions. First, as noted above, an overhead aircraft door normally carries emergency escape slide equipment. When this equipment is removed from the door, the weight of the door is significantly reduced, thus causing an overbalancing force to be applied to the door by the counterbalance assembly. When the door is unlatched and moved toward its upward position, the counterbalance assembly will raise the door much too fast but for the action of the centrifugal brake. When the rotational speed of the shaft 36 and thus the greatly increased rotational speed of the brake shoes about the stub shaft 108 reaches a predetermined speed, the biasing force of the brake shoe springs 128 will be overcome to allow the shoes to contact the brake drum surface 120 on the housing, thus governing the rotational rate of the stub shaft 108 and in turn of the main torque shaft 36. Likewise, if one or more of the torsion springs 68 and 70 were to fail for some reason while the door was in an open position, the door would rapidly fall but for the similar governing action of the centrifugal brake.

The counterbalance assembly of the present invention has been described above in relation to a preferred embodiment. Although no equivalents have been discussed, one of ordinary skill in the art, after reading the foregoing specification, will be able to make a variety of changes or will be able to substitute various equivalent components, and will be able to make other alterations without departing from the scope and intent of the invention as disclosed. It is therefore intended that the scope of protection granted by Letters Patent be limited only by the definition of this invention set forth in the appended claims.

What is claimed is:

1. A torsional counterbalance assembly for counterbalancing the weight of an object mounted for movement in a vertical direction comprising:
   a first rotatable member having a rotational axis and frame means mounting said rotatable member for rotation about its axis,
   spring means associated with said first rotatable member for imparting torque to said first rotatable member to rotate said first rotatable member in a first direction and to resist rotation of said first rotatable member in the opposite direction,
   a second rotatable member associated with said first rotatable member and mounted for rotation relative thereto, and means associated with said second rotatable member for translating the rotational motion thereof into motion corresponding to the movement of said object,
   manually actuated connection means associated with said first and second rotatable members for releasably interconnecting said first rotatable member and said second rotatable member in mutually driving relationship, so that said first rotatable member can rotate independently from said second rotatable member when released from said second rotatable member.
   manually actuated locking means associated with said frame means for selectively preventing said second rotatable member from rotating, and
   drive means associated with said first rotatable member for manually rotating said first member.

2. The counterbalance assembly of claim 1 further comprising:
   governing means for limiting the speed at which said first rotatable member rotates.

3. The counterbalance assembly of claim 2 further comprising:
   speed reducing means operably interposed between said drive means and said first rotatable member for increasing the speed of said drive means relative to said first rotatable member.

4. The counterbalance assembly of claim 3 wherein said governing means comprises a centrifugal brake having a braking surface associated with said frame means and brake shoes actuated against said surface by centrifugal force, and means for mounting said brake shoes for rotation and for coupling said shoes to be driven by said speed increasing means so as to cause said brake shoes to be rotated at a greater rotational speed than said first rotatable member.

5. A torsional counterbalance assembly for use with a vertically slidable door comprising:
   a frame,
   a shaft journalled in said frame for rotation about its rotational axis,
   a hub fixed to said shaft and having a diameter greater than said shaft,
   at least one torsion spring having first and second ends respectively affixed to said hub and to said frame,
   a cable drum journalled for rotation on said shaft and means for releasably affixing said drum for rotation with said shaft, said drum having a cable wrapped thereabout, said cable being capable of affixation to said door,
   drive means coupled to said shaft for manually rotating said shaft when said cable drum is released from said shaft, and
   means for fixing said cable drum to said frame when said connection means releases said drum so that said drum remains stationary when said shaft is manually rotated to pre-tension said torsion spring.

6. The counterbalance assembly of claim 5 further comprising:
   support means mounted on each of said drum and said frame and cooperating with the end coils of said torsional spring to coaxially center said spring about said shaft.

7. A torsional counterbalance assembly for use with a vertically slidable door comprising:
   a frame,
   a shaft journalled in said frame for rotation about its rotational axis,
   a hub fixed to said shaft and having a diameter greater than said shaft,
   at least one torsion spring having first and second ends respectively affixed to said hub and to said frame, a cable drum journalled for rotation on said shaft and means for releasably affixing said drum for rotation with said shaft, said drum having a cable wrapped thereabout, said cable being capable of affixation to said door, drive means coupled to said shaft for manually rotating said shaft, and a centrifugal brake means associated with said frame for governing the rotational speed of said shaft and means for coupling said brake means for rotation by said shaft.

8. The counterbalance assembly of claim 7 wherein said means for coupling said brake means for rotation by said shaft comprises:

a gear train means for increasing the rotational speed of said centrifugal brake means relative to said shaft, said gear train means having a low speed rotational input member and a high speed rotational output member, said low speed member being coupled to said shaft for rotation therewith and said high speed member being coupled to drive said brake means.

9. The counterbalance assembly of claim 8 wherein said drive means is coupled to said high speed output member for rotation therewith.

10. A torsional counterbalance assembly for use with a vertically slidable door comprising:

a frame, a shaft journalled in said frame for rotation about its rotational axis, a hub fixed to said shaft and having a diameter greater than said shaft, at least one torsion spring having first and second ends respectively affixed to said hub and to said frame, a cable drum journalled for rotation on said shaft and means for releasably affixing said drum for rotation with said shaft, said drum having a cable wrapped thereabout, said cable being capable of affixation to said door, drive means coupled to said shaft for manually rotating said shaft, and gear train means for increasing the rotational speed of said drive means relative to said shaft, said gear train means having a low speed rotational input member and a high speed rotational output member, said low speed member being coupled to said shaft for rotation therewith and said high speed member being operatively coupled to said drive means.

* * * * *

UNITED STATES PATENT AND TRADEMARK OFFICE
CERTIFICATE OF CORRECTION

PATENT NO. : 4,047,441
DATED : September 13, 1977
INVENTOR(S) : Richard Webster Kellogg It is certified that error appears in the above-identified patent and that said Letters Patent are hereby corrected as shown below:

On the first page of the Letters Patent, item [73] Assignee:

list also: --Aeritalia S.p.A., Napoli, Italy--.

*Signed and Sealed this*

*Twenty-first* Day of *February 1978*

[SEAL]

Attest:

RUTH C. MASON
*Attesting Officer*

LUTRELLE F. PARKER
*Acting Commissioner of Patents and Trademarks*